United States Patent [19]

Steingraber et al.

[11] Patent Number: 4,481,906
[45] Date of Patent: Nov. 13, 1984

[54] VALVE FOR USE IN A SUCTION LINE

[75] Inventors: Gary C. Steingraber, Madison; Terrence J. Mullen, Sun Prairie, both of Wis.

[73] Assignee: DEC International, Inc., Madison, Wis.

[21] Appl. No.: 516,757

[22] Filed: Jul. 25, 1983

[51] Int. Cl.³ .............................................. A01J 5/08
[52] U.S. Cl. .............................. 119/14.32; 119/14.36; 119/14.38; 119/14.47
[58] Field of Search .............. 119/14.47, 14.38, 14.32, 119/14.36

[56] References Cited

U.S. PATENT DOCUMENTS 1,159,103 11/1915 Sabroe .............................. 119/14.38
2,986,117 5/1961 Ronaldson ....................... 119/14.38

FOREIGN PATENT DOCUMENTS 581910 12/1977 U.S.S.R. ............................ 119/14.47

Primary Examiner—Hugh R. Chamblee
Attorney, Agent, or Firm—Michael, Best & Friedrich

[57] ABSTRACT

The valve comprises a housing connected to the outlet of a teat cup assembly. The housing includes a nipple formed in the bottom portion thereof for connection to a milk suction line. A ball member is mounted inside the valve housing and adapted to seat at the opening from the housing into the nipple when the interior of the housing is exposed to atmospheric pressure. The valve further includes a plunger slidably mounted in the wall of the valve housing, and the plunger is adapted to slide inwardly into the valve housing when the pressure in the housing falls below atmospheric pressure. The inward movement of the plunger is adapted to dislodge the ball member from its seated position at the nipple opening. The plunger member has an elastomeric washer mounted thereon which seals against the housing when the plunger slides inwardly. The washer has a locking ear thereon which engages a projection on the housing to lock the plunger in its retracted position during cleaning.

4 Claims, 3 Drawing Figures

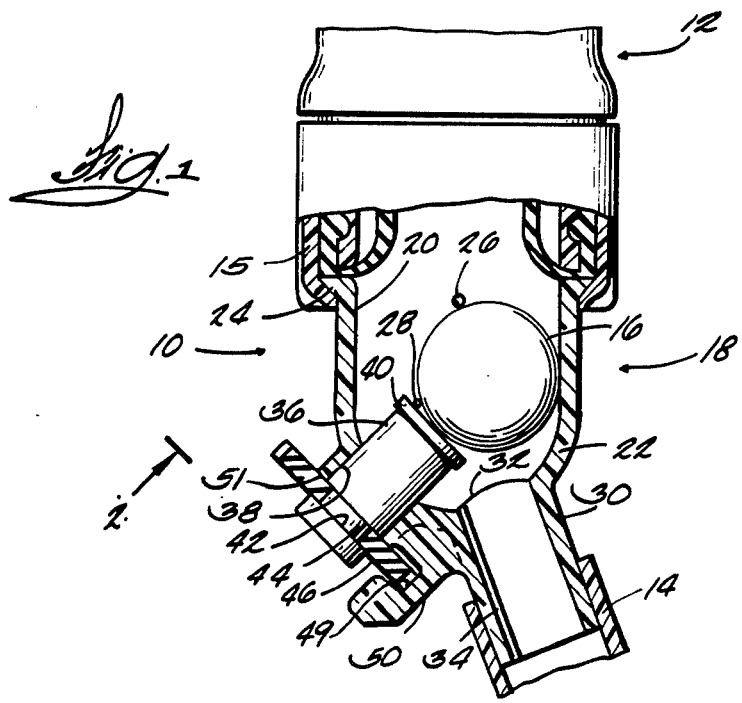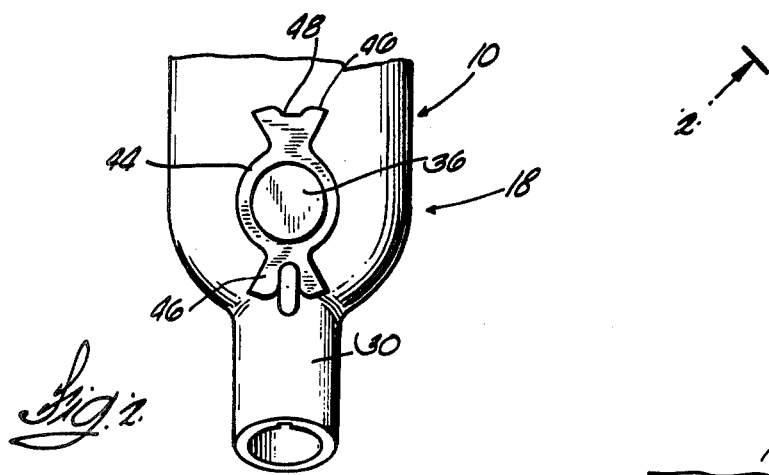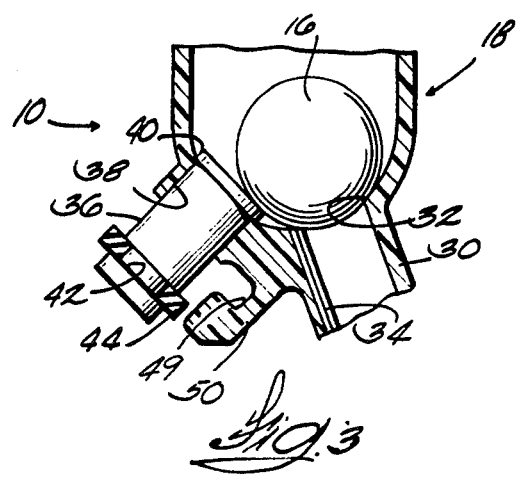

VALVE FOR USE IN A SUCTION LINE

BACKGROUND OF THE INVENTION

This invention relates to valves used in suction lines and, more particularly, to valves used between suction lines and teat cup assemblies.

More specifically, this invention relates to an improvement of the valve shown and described in application Ser. No. 411,546 filed Aug. 25, 1982 and assigned to the assignee of this application.

SUMMARY OF THE INVENTION

The principle object of this invention is to provide a valve for use between a suction line and a teat cup assembly which is simple and reliable, and which will permit a teat cup assembly to be placed on a cow's udder and used without requiring an operator to open the valve.

This invention is an improvement of that shown in application Ser. No. 411,546 in that it provides a means for positively sealing the valve plunger in the valve housing during normal milking operations and also provides a means for locking the valve in its open position when washing the system.

DESCRIPTION OF THE DRAWINGS

FIG. 1 is a fragmentary sectional view of the valve;
FIG. 2 is a view taken along line 2—2 of FIG. 1; and
FIG. 3 is a view similar to FIG. 1 but showing the valve in its closed position.

DESCRIPTION OF THE PREFERRED EMBODIMENT

With particular reference to the drawings, a valve 10 is illustrated connected between a teat cup assembly 12 and a milk suction line 14. The teat cup assembly 12 is of conventional design, such as described in U.S. Pat. No. 4,269,143, which is incorporated herein by reference. The milk line 14 is connected to a milking claw (not shown) of any suitable design.

The valve 10 comprises a ball 16 enclosed in a housing 18 preferably made of transparent plastic.

The housing 18 includes an open upper end portion 20 and a bottom portion 22. The upper end 20 opens into the interior of teat cup assembly 12 and is provided with an outwardly extending lip 24 for attachment to teat cup assembly 12 with threaded collar 15 as shown and described in U.S. Pat. No. 4,269,143. A pin 26 is attached to the sides of the housing 18 and extends across the open upper end 20. The pin 26 keeps the ball 16 inside the housing 18. A vent hole 28 is provided in the wall of housing 18 for a purpose which will be explained later.

Formed in the bottom portion 22 of the housing is a nipple 30 for establishing connection of the housing interior to suction line 14. Nipple 30 extends at an angle to the vertical axis of the teat cup assembly 12.

The upper end 32 of the nipple acts as a seat for the ball 16. A groove 34 extending the length of the interior surface of the nipple 30 provides a leakage path past ball 16 when the ball is seated on the end 32 of the nipple 30.

Mounted adjacent the nipple 30 is a plunger 36 slidably mounted in a sleeve or bore 38 in the bottom portion 22 of the housing. The plunger 36 is inclined upwardly towards the ball 16. The plunger 36 has a rim 40 formed on the end thereof to retain the plunger 36 in the bore 38.

The diameter of the plunger 36 is less than the diameter of the bore 38 to ensure free sliding movement of the plunger in the bore. Mounted in a groove 42 in the outer end of plunger 36 is a washer member 44 of resilient material, preferably rubber. Washer 44 is provided with a pair of locking ears 46, 46 formed on the periphery thereof. Each locking ear 46 has a notch 48 therein. One or the other of ears 46, 46 is adapted for locking engagement in a groove 48 formed in a retaining projection 50 extending from the lower portion 22 of the valve housing 18. The function and operation of washer 44 will be described in detail hereinafter.

OPERATION

In operation, the teat cup assembly 12, valve 10 and milk suction line 14 are connected and then placed on the cow's udder (not shown). Since the teat cup assembly 12 is on the cow's teat and shut off from atmosphere, the slight suction leak past ball 16 through groove 34 causes a vacuum to form in housing 18. When the component force on the plunger 36 due to the pressure differential across the ends of the plunger 36 is greater than the suction force on ball 16, the plunger moves into the housing 18 and the end 40 of the plunger dislodges the ball 16 from the seat 32 and lifts the ball 16 and thus fully opens the milk line 14.

As plunger 36 moves to its fully retracted position, the face of washer 44 moves into sealing engagement with the end surface 51 of the plunger bore 38. The washer 44 thus provides a seal at the bore 38 to prevent any air from leaking into housing 18 around the plunger 36. Vent opening 28 in the housing wall permits a slight air leak into the housing 18 to enhance the flow of milk out of the housing and into the milk line 14.

When the teat cup 12 is removed from the cow's udder, either intentionally or accidentally, atmospheric air rushes into the teat cup 12 and valve 10, thus removing the pressure differential across the plunger 36. Suction from line 14 forces the ball 16 to become seated in opening 32 as shown in FIG. 3. The closed valve 10 then significantly reduces the suction in the teat cup assembly 12, thus reducing the likelihood of any foreign matter entering the milking system. Since the valve 10 closes before a significant amount of atmospheric air enters the milk line 14, the integrity of the milking system is maintained. For example, if one teat cup assembly 12 falls off the cow inadvertently, suction in the other teat cups will be maintained to prevent them from falling off also.

When it is desired to wash the system by the introduction of a cleaning fluid into the teat cup assemblies, the plunger 36 (and washer 44 mounted thereon) is depressed and rotated to the position shown in FIGS. 1 and 2. This will cause a notch 48 on a washer ear 46 to move to engagement with the notch 49 in projection 50. The ears 46 on washer 44 are dimensioned so that the ends thereof will be compressed slightly as the washer is rotated into its locked position. This will prevent nonintentional rotation of the washer from the locked position. With the plunger and washer in the locked position, the ball will be positively held in its open position to allow flow of washing fluid through the valve 10 into milk line 14.

It is to be understood that the invention is not confined to the particular construction and arrangement of parts herein illustrated and described, but embraces all such modified form thereof that come within the following claims.

We claim:

1. A valve assembly for mounting in the outlet of a teat cup assembly comprising:
   a valve housing connected to the outlet of a teat cup assembly, said housing having a nipple formed in the bottom portion thereof for connection to a milk suction line;
   a ball member mounted inside said valve housing and adapted to seat at the opening from said housing into said nipple when the interior of said housing is exposed to atmospheric pressure, the relationship between said ball member and said nipple opening on which it seats is such that there will be a small leakage path past said ball member when said ball member is seated on said nipple opening; and
   a plunger slidably mounted in an opening in the wall of said valve housing, said plunger means adapted to slide inwardly into said valve housing when the pressure in said housing falls below atmospheric pressure, said inward movement of said plunger adapted to dislodge said ball member from its seated position at the nipple opening, said plunger means further including a washer member of resilient material mounted thereon exteriorly of said housing wall, said washer member adapted to move into sealing engagement with said housing wall when said plunger slides inwardly into said housing to thereby prevent leakage of air around said plunger and into said housing.

2. A valve assembly according to claim 1 in which said washer member has an ear formed thereon and said housing member has a projection formed thereon, said ear adapted to move into locking engagement with said projection when said plunger is rotated in said wall opening.

3. A valve assembly according to claim 2 in which said washer ear and said projection have mating grooves formed therein.

4. A valve assembly according to claim 3 in which said valve housing has a vent opening in said housing wall.

* * * * *